(12) United States Patent
Voelckers

(10) Patent No.: US 7,534,973 B2
(45) Date of Patent: May 19, 2009

(54) DEVICE FOR DETECTING A MECHANICAL ACTUATION OF AN INPUT ELEMENT BY USING DIGITAL TECHNOLOGY, AND METHOD FOR PROCESSING AND CONVERTING THE DIGITAL INPUT SIGNAL INTO COMMANDS FOR CONTROLLING A LOAD

(76) Inventor: Oliver Voelckers, Im Kirschengarten 26, Trier (DE) D-54294

( * ) Notice: Subject to any disclaimer, the term of this patent is extended or adjusted under 35 U.S.C. 154(b) by 667 days.

(21) Appl. No.: 10/518,572

(22) PCT Filed: Jun. 20, 2003

(86) PCT No.: PCT/EP03/06517

§ 371 (c)(1),
(2), (4) Date: Sep. 20, 2005

(87) PCT Pub. No.: WO04/001782

PCT Pub. Date: Dec. 31, 2003

(65) Prior Publication Data

US 2006/0131156 A1    Jun. 22, 2006

(30) Foreign Application Priority Data

Jun. 24, 2002    (DE) ................................ 102 28 185

(51) Int. Cl.
*H01H 25/04* (2006.01)
(52) U.S. Cl. ........................................ 200/5 R; 200/6 A
(58) Field of Classification Search .................. 200/5 R, 200/6 A; 341/35, 22, 34, 26; 345/156, 157, 345/161, 160, 162, 184; 74/471, 471 XY; 273/148; 463/47; 250/221; 338/54, 68, 338/154
See application file for complete search history.

(56) References Cited

U.S. PATENT DOCUMENTS 4,476,356 A * 10/1984 Nakayama et al. .......... 200/6 A
5,252,971 A * 10/1993 Franz et al. ................... 341/26

(Continued)

FOREIGN PATENT DOCUMENTS

DE          3426922        1/1986

(Continued)

*Primary Examiner*—Michael A Friedhofer
(74) *Attorney, Agent, or Firm*—Norris, McLaughlin & Marcus, P.A.

(57) ABSTRACT

The aim of the invention is to develop a device for detecting and processing input pulses induced by a mechanical actuation of an input element, which is spring-suspended inside a plane and which can be actuated out of this plane both in a vertical direction as well as in a direction that is diagonal to the vertical at a specified angle, by transmission to a switching element that detects the actuating position. To this end, the inventive device is provided with a switch element (18, 15), which converts the series of motions, to which the input element (11) is subjected, into electrical digital signals, and with control electronics (16, 17). Said control electronics operate on the basis of a pattern recognition and convert the electrical signals, which are provided by the switch element (18, 15), into commands for subsequent loads. The switch element (18, 15) comprises a multitude of contact pairs of the contact matrix (15), whereby these contact pairs can be closed according to the position of the input element (11) based on an arbitrarily made selection.

26 Claims, 9 Drawing Sheets

U.S. PATENT DOCUMENTS

Figure 1:
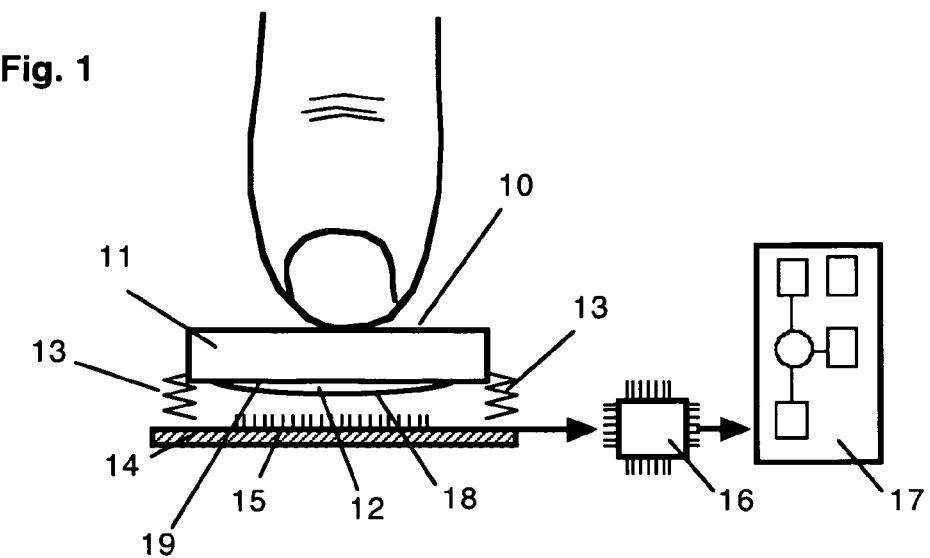

| | | | |
|---|---|---|---|
| 5,555,004 A * | 9/1996 | Ono et al. | 345/161 |
| 5,670,955 A | 9/1997 | Thorne, III et al. | 341/34 |
| 5,815,139 A | 9/1998 | Yoshikawa et al. | 345/157 |
| 5,861,823 A * | 1/1999 | Strauch et al. | 341/22 |
| 5,949,325 A * | 9/1999 | Devolpi | 338/154 |
| 5,949,354 A * | 9/1999 | Chang | 341/33 |
| 6,236,034 B1 * | 5/2001 | DeVolpi | 250/221 |
| 6,271,834 B1 * | 8/2001 | May et al. | 345/168 |
| 6,313,731 B1 | 11/2001 | Vance | 338/185 |
| 6,313,826 B1 | 11/2001 | Schrum et al. | 345/161 |
| 6,429,792 B1 * | 8/2002 | Burton | 341/22 |
| 7,078,633 B2 * | 7/2006 | Ihalainen | 200/6 A |
| 7,324,020 B2 * | 1/2008 | Pihlaja et al. | 341/22 |
| 7,402,764 B2 * | 7/2008 | Pihlaja et al. | 200/5 R |
| 2002/0009193 A1 | 1/2002 | Deguchi | 379/433.01 |

FOREIGN PATENT DOCUMENTS

| | | |
|---|---|---|
| EP | 0 540 147 A2 | 8/1992 |
| EP | 0 640 937 A1 | 8/1994 |
| JP | 8124461 | 5/1996 |

* cited by examiner

2x Key concave

Dome

Joystick

LCD

|  | Force sensors | Keys | Invention |
|---|---|---|---|
| Technology | Sensor | Switches | Switch matrix |
| Measures... | Force | vertical activation | Tilt |
| Key function | no | yes | optional |
| Tactile feedback | no | yes | optional |
| Multiple steps | *yes* | no | yes |
| Resolution | fixed, many | 2 | scalable |
| Pattern recog. | no | no | yes |
| Interface | analog | *digital* | digital |
| Segments of circle | approx. 20-200 | 2-4 | 2-approx. 50 |
| Stable values | no | *yes* | yes |

DEVICE FOR DETECTING A MECHANICAL ACTUATION OF AN INPUT ELEMENT BY USING DIGITAL TECHNOLOGY, AND METHOD FOR PROCESSING AND CONVERTING THE DIGITAL INPUT SIGNAL INTO COMMANDS FOR CONTROLLING A LOAD

The following invention describes an apparatus for the sensing of input pulses caused by the mechanical activation of an input element, that are activated during the operation of electronic devices by an operating person as well as a procedure to process the values of the input pulses related to the measurable position of the activation.

The following techniques are known to in order to determine the position of a switch element of electronic devices in the sense of a mechanical movement during activation:

- so-called analogue joysticks of computer games contain two potentiometers that are mechanically coupled to the tilt of the joystick. Their electrical resistance corresponds to the x- and y-values of the tilt.
- Discs with holes can deliver digital signals when combined with light barriers (opto couplers) to report the position of a switch element. When the travel distance is sufficient, a high resolution can be achieved.
- Force sensors such as strain gauges, force sensing resistors (FSR) or hall sensors deliver analog signals. Their values are related to the force applied to the sensor. This is even possible with a small travel distance.
- Seesaw keys, often implemented as 2-way or 4-way cursor key pad, measure one level in any of two or four directions, and sometimes also the activation of the middle position. With significant mechanical cost, special combination switches can also determine a few more steps.

The solution with potentiometers is mechanically expensive, results in a certain weight and it is subject to vibration and shock. Thus, potentiometers are less suitable for mobile devices. Discs with holes and opto couplers are smaller, lighter and deliver a digital signal. They are also subject to mechanical vibration and also against dirt.

In contrast, force sensors can be built very small and mechanically robust. However, they require a complex electronic controller with an interpretation of sensed analog signals. This high cost prevents the mass usage of force sensors with electronic devices.

Seesaw keys, on the other hand, are commonplace because they are small, light, robust and low-cost. However, they only offer 2 up to 5 switch positions so they are not suitable for the operation of graphical user interfaces.

A variable activatable input apparatus for cursor control on a PC display is known from U.S. Pat. No. 5,815,139. This apparatus makes use of an input element that can be freely moved within one plane, and that allows to register the positions of the tilted input element changed by mechanical force applied to flat sensor. The tilt and force applied to the input element can be determined by measuring several variable resistances. During this process, analog measured values are delivered that can show inaccuracies due to temperature dependance. The processing of the measured values requires digitizing them, making a controller necessary.

Several analog systems are known to transmit the movements forced to an input element for mechanical devices. These are complicated to manufacture and thus expensive. The mechanical devices can also be controlled by electrical transmission systems, however there are no complementary low-cost apparatus to sense the mechanical activation of an input element, so that it could detect any position of an input element during a mechanical activation during any movement phase.

The targets of the invention are to create an apparatus to sense input pulses that are caused by a switch element that determines the activation position of a mechanical activation of an input element, as well as a small and robust construction, a low-cost design, easy-to-learn operation and a precise processing of the resulting input pulses with electronic devices.

The invention's task is to develop an apparatus for sensing and processing input pulses that are caused by XXX 4/5.

The task is solved by the features described in the independent patent claims.

According to the invention, a user interface element, e.g. a key or a joystick is tilted against an elastic force, whereas an electrical conductive area at the underside of the user interface element touches a contact matrix at varying positions and thus closes electrical contacts. The closed contacts are related to the tilt of the user interface element, where the closed contacts deliver measurement values which are interpreted by an electronic controller, and where the procedure according to the invention determines the tilt, the direction of activation and the pressure force.

The invention will be demonstrated by means of an example. The figures are as follows:

FIG. 1: a general structure of an apparatus according to the invention

Figure 2:
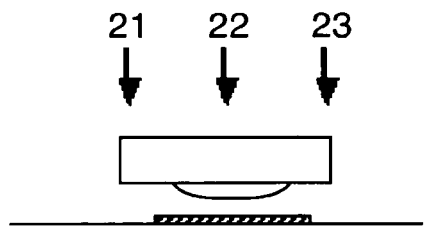

FIG. 2: Possible operations of an input element of an apparatus according to the invention with an activation in vertical direction at various positions FIG. 3: Possible operations of an input element of an apparatus according to the invention with an activation in vertical and then tilted directions FIG. 4: Possible operations of an input element of an apparatus according to the invention with an activation in tilted direction FIG. 5: an implementation of an input element according to the invention, form factor "key", position after vertical activation in the center of the input element with small force FIG. 6: closed contacts according to FIG. 5

Figure 7:
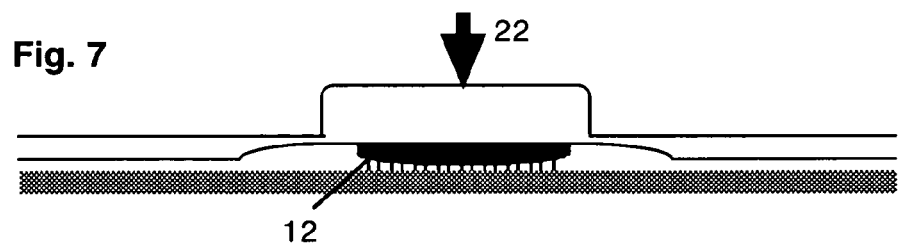
Figure 8:
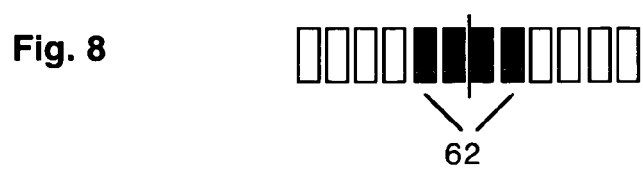

FIG. 7: an implementation of an input element according to the invention, form factor "key", position after vertical activation in the center of the input element with high force FIG. 8: closed contacts according to FIG. 7

Figure 9:
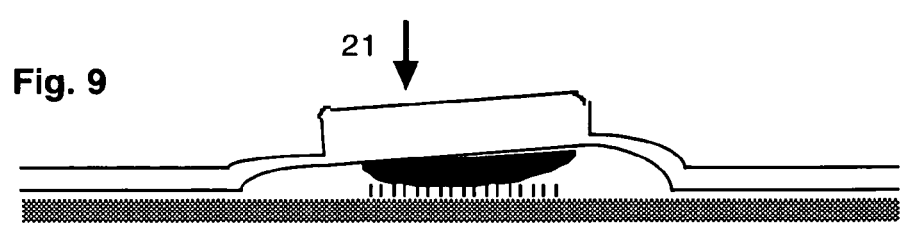
Figure 10:
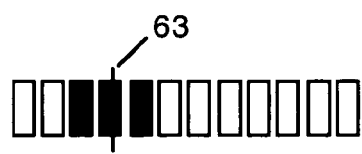

FIG. 9: an implementation of an input element according to the invention, form factor "key", position after a tilted activation at one edge of the input element FIG. 10: closed contacts according to FIG. 9

Figure 11:
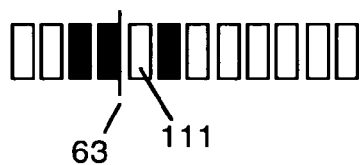

FIG. 11: closed contacts according to FIG. 9 with an alternating force

Figure 12:
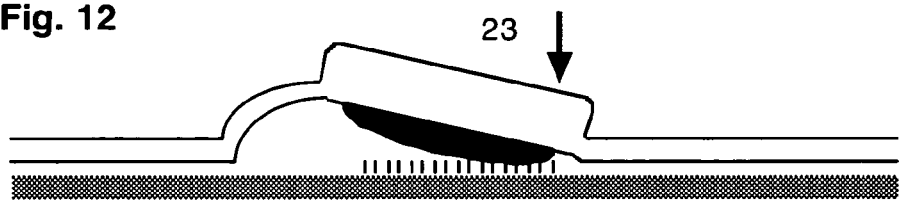
Figure 13:
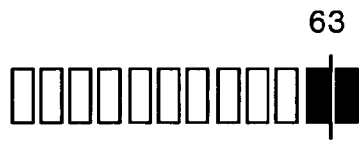

FIG. 12: an implementation of an input element according to the invention, form factor "key", position after a one-sided tilted activation at the outmost edge of the input element FIG. 13: closed contacts according to FIG. 12

Figure 14:
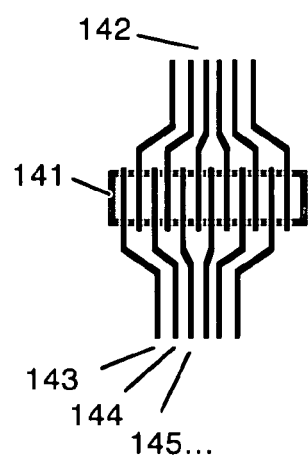

FIG. 14: an example for the design of the conductive paths, to determine the degree of tilt within one axis (one-dimensional sensor)

Figure 15:
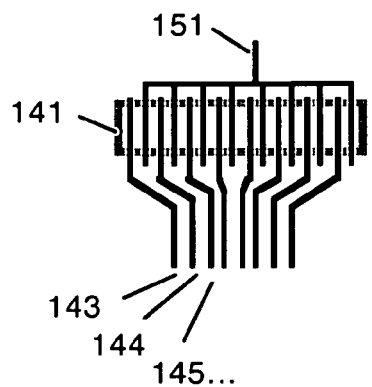

FIG. 15: another example for the design of the conductive paths, to determine the degree of tilt within one axis (one-dimensional sensor)

Figure 16:
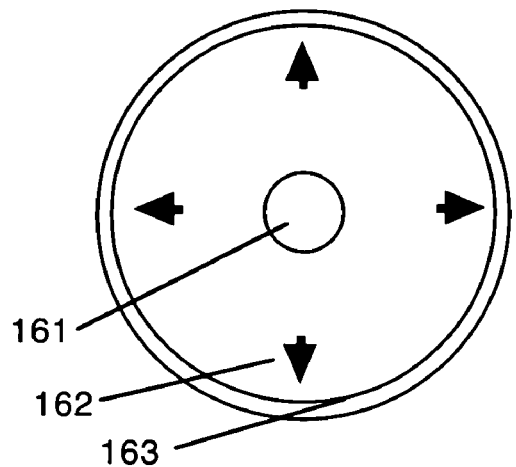
Figure 17:
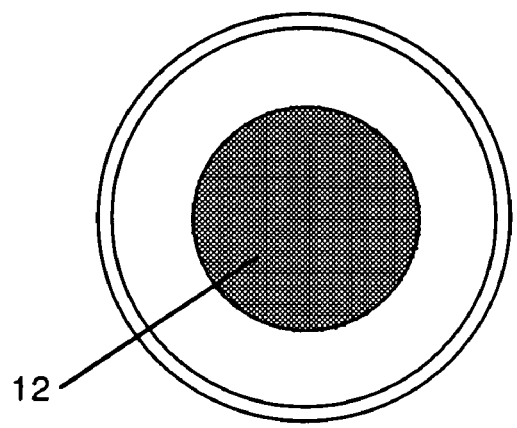
Figure 18:
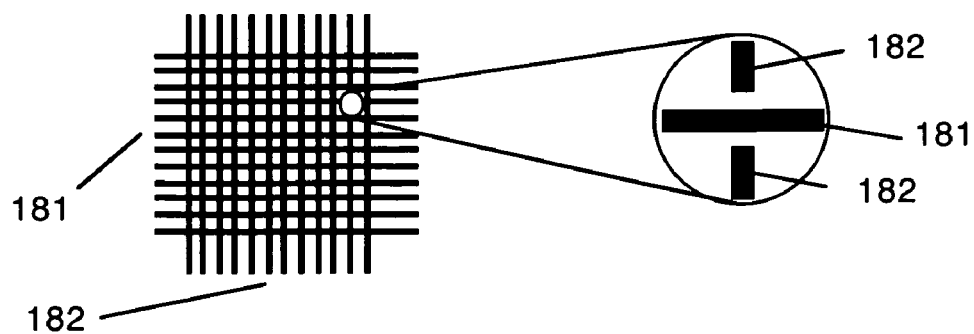
Figure 19:
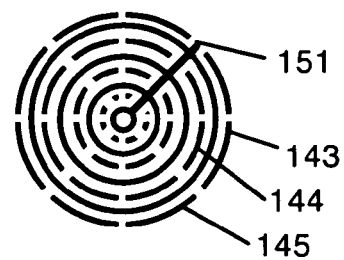
Figure 20:
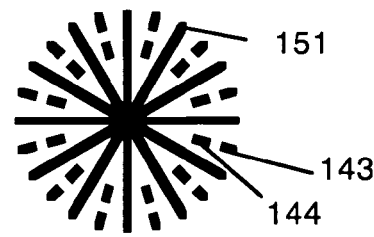
Figure 21:
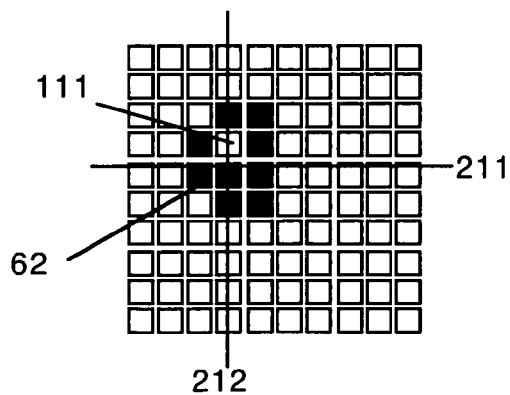
Figure 22:
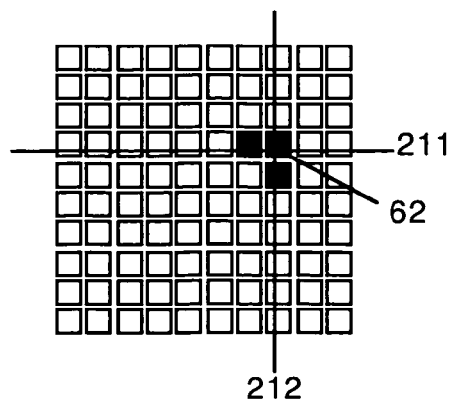
Figure 23:
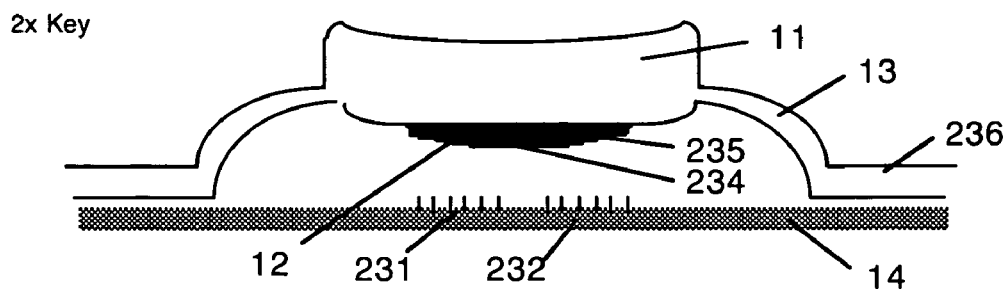
Figure 24:
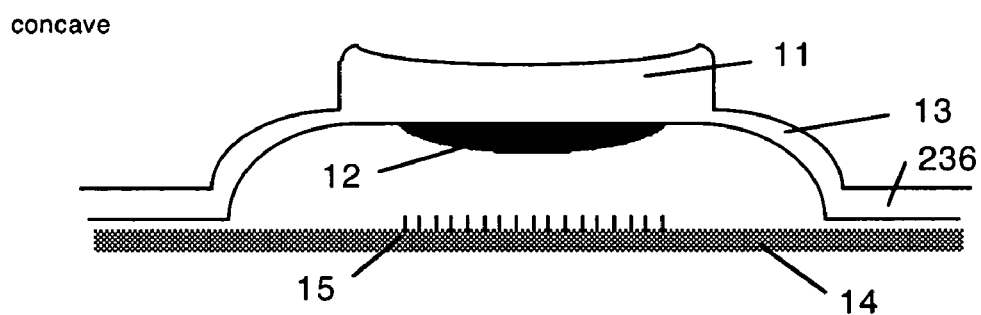
Figure 25:
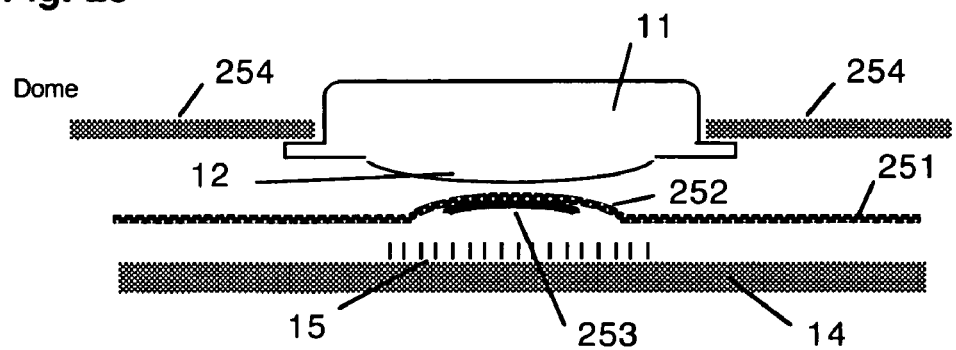
Figure 26:
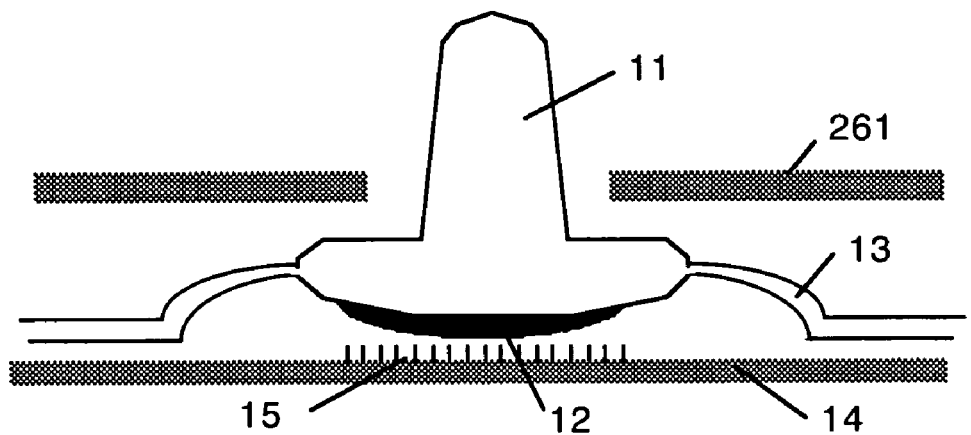
Figure 27:
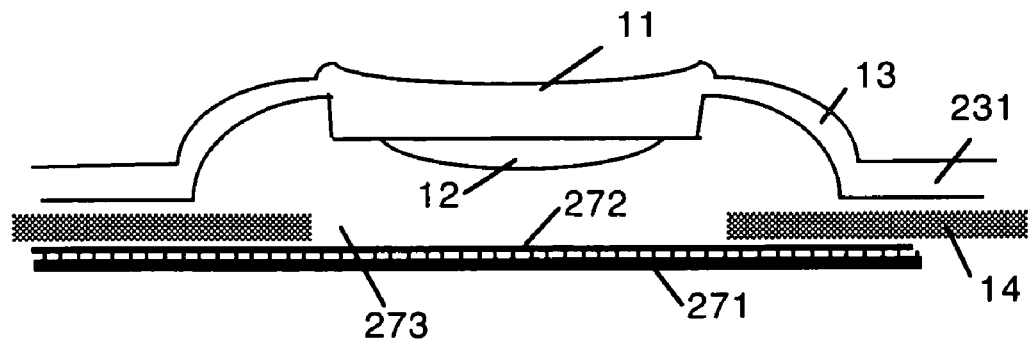
Figure 28:
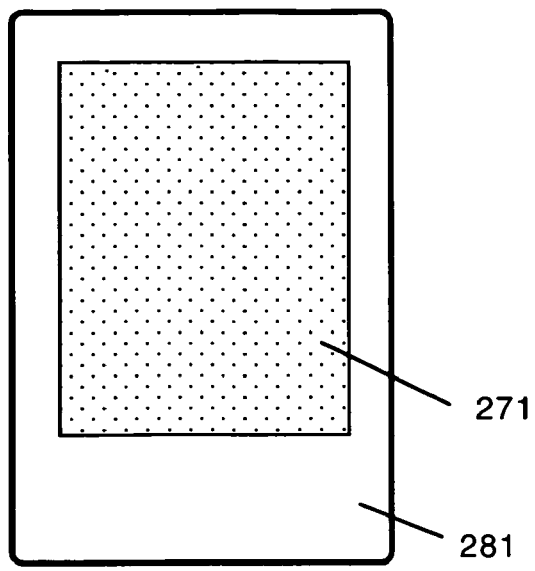
Figure 29:
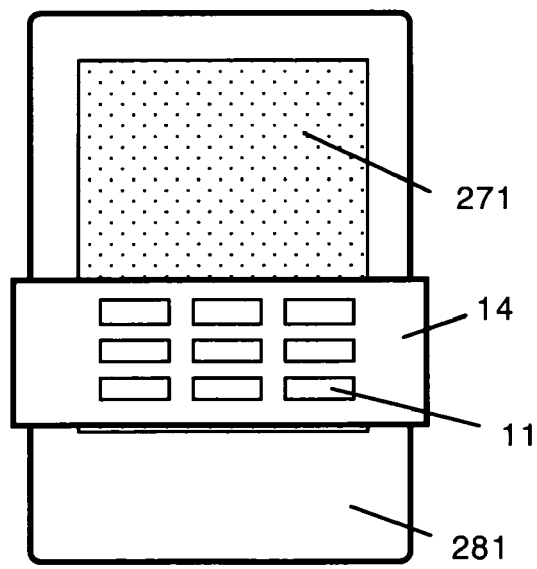
Figure 30:
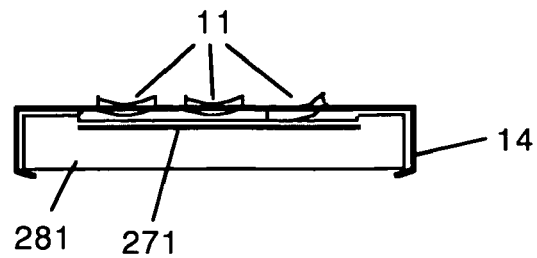
Figures 31, 32:
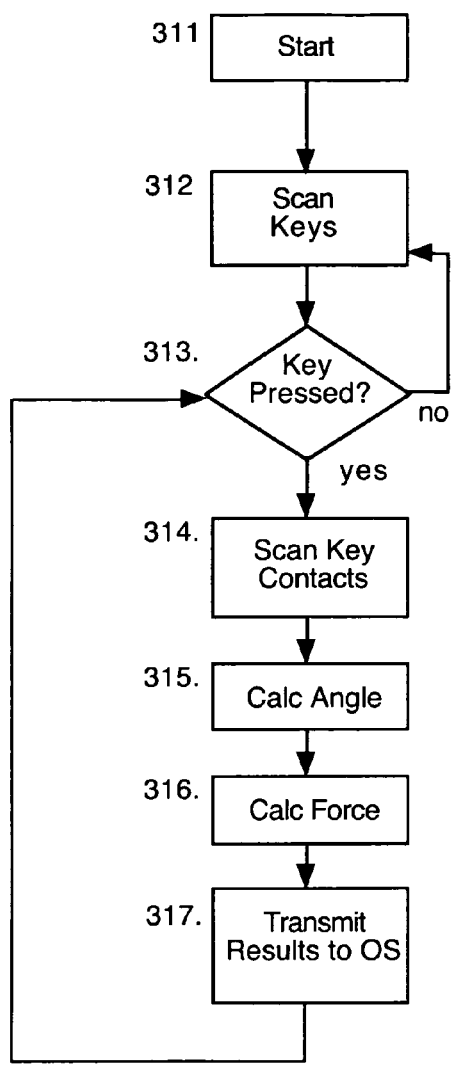

FIG. 16: a two-dimensional sensor with a disc-type input element, viewed from the top FIG. 17: a two-dimensional sensor with a disc-type input element, viewed from the bottom FIG. 18: a two-dimensional design of conductive paths FIG. 19: another two-dimensional design of conductive paths FIG. 20: another two-dimensional design of conductive paths FIG. 21: an example for the closed contacts of a two-dimensional sensor FIG. 22: another example for the closed contacts of a two-dimensional sensor FIG. 23: an implementation of an input element according to the invention FIG. 24: an implementation of an input element according to the invention FIG. 25: an implementation of an input element according to the invention FIG. 26: an implementation of an input element according to the invention FIG. 27: an implementation of an input element according to the invention FIG. 28: a portable computer with a touch-sensitive display FIG. 29: a portable computer with a touch-sensitive display with an add-on FIG. 30: an add-on according to FIG. 29 in cross-section perspective FIG. 31: a flowchart of the procedure according to the invention to evaluate the sensor signal FIG. 32: a comparison of various sensor technologies The apparatus according to the invention for sensing and processing of input pulses evoked by activation of input elements, and for the conversion of a digital input signal into commands for operating electronic devices consists of at least one input element 11 that is formed like a key and can be operated by a finger movement. Opposite its activation surface 10, on its underside 19, this input element features a calotte 12 consisting of a single material. The calotte 12 is formed like a ball and is coated with an electrical conductive contact coating 18 on a convex surface oriented towards the contact matrix 15, where the input element 11 is mounted manouevrable against an elastic force 13 within a casing not shown here. Underneath the input element 11 there is a base plate 14 that features a contact matrix 15 which is connected via an interface with a scanning unit 16 for a real-time analysis of input pulses, that is subsequently connected to a pattern recognition unit 17.

The input element 11 is operable with a finger movement on the activation surface 10, alternatively in a vertical direction in the key center 22 like a pushbutton, or on its left edge 21 or its right edge 23. This allows the contact coating 18 of the calotte 12 to close various contacts of a linear arrangement, i.e. alternating sequence of the contacts 142, 143, 144, 145 and 151 within the contact matrix 15 depending on the position of the input element 11. The input element 11 can be activated not only as described in vertical direction; if the key center 22 is kept pressed in a vertical direction, the input element 11 can be forced into a rolling movement 24 either in the right or left direction. Depending on the degree of the rolling movement of the calotte 12, the contact matrix 15 connects different contacts; additionally the applied force plays a role for the contact connections. If the calotte 12 is made of a deformable material, a varying pressure of the finger applied to the input element 11 leads to a varying number of contacts closed simultaneously within the contact matrix 15 through the contact coating 18 of the calotte 12. Alternatively, the input element may be used with a joystick movement 25. The possibilities of contact connections depending on the described modes of operation of the input element 11 are shown in FIG. 5 to 12; indicating a stronger force on the input element 11 with a bolder arrow symbol.

The contact matrix 15 consists, as shown in FIGS. 14 and 15, of several electrical single contacts 142, 143, 144, 145 and 151 in a contact row, which are mounted on a base plate 14. The contacts are activated by the calotte 12 with its contact coating 18, which can optionally consist of a deformable material that ensures a pressure-dependent number of several contact closings. The calotte consisting of a deformable material may alternatively not be equipped with a contact coating 18 but consist of a electrically conductive material; this is another aspect of the invention. The activation surface of the input element 11 can adopt any geometrical shape of a flat surface. In practice, two specific forms have evolved, a rectangular and a circular shape. The basic shape of the calotte 12 depends on the selected shape of the activation surface 10. Other than the line-sequence arrangement of contacts in the contact matrix 15, another aspect of the invention allows to adapt the form of the contact matrix 15 to the activation surface 10. This allows the input element 11 to operate like an analog joystick, where the user's movements of the input element 11 are detected.

The switch contacts of the contact matrix 15 are scanned by a scanning unit 16, as known from conventional keyboards. With the sensor designed according to the invention, however, the number of switch contacts is much higher. Depending on the tilt of the input element 11, different contacts on the contact matrix 15 are closed, as the convex underside 19 of the calotte 12 of the input element 11 is rolled on the contact matrix 15.

The plurality of switch contacts of the sensor lead to ambiguous switch conditions, that cannot be interpreted by conventional circuitry. An innovative pattern recognition scheme as implemented by the procedure according to the invention interprets the switch conditions and assigns a tilt position and the orientation of the input element 11 to them and optionally the applied force.

In its simplest form, the sensor consists of only two switches, which can be associated with four switch conditions (off, left, center, right), the center condition being reached when both contacts are closed at the same time. If more switches are available, a much higher resolution can be achieved; and with redundant contacts the reliability can also be improved.

Depending on the implementation of the sensor, the movement resp. the tilt of the input element 11 can be determined either on one axis or on two axis. This requires a one-dimensional resp. two-dimensional contact array. Additionally it is possible to conclude the applied force from the deformation of a soft calotte 12 and the resulting number of closed contacts. The input element 11 with a convex calotte 12 at its underside 19 is held in a center position against the base plate 14 by an elastic force 13. If the input element 11 is pressed into the direction of the base plate 14 with one or more fingers, then the calotte 12 ensures electrical connections at certain positions of the contact matrix 15. In this context, the input element 11 is manouevrable downwards and tiltable.

The invention can be used in connection with a graphical user interface with various usages. Depending on the situation, different applications can be offered on the display. It is possible to implement parameter settings, menu navigation, key input and mouse pointer control with identical hardware.

While ordinary keys only differentiate between a passive state and a key activation, the invention allows to register the details of operation through connections of the contact matrix 15 in so much detail, that the tilt of the input element 11 allows to conclude the position of one or more finger on the input element 11.

FIG. 2 shows which typical user interface actions cause the tilt of a flat input element 11 that is similar to keys. The simplest case is that the input element 11 is activated at its left edge 21, at its center 22 or at the right edge 23, with an ordinary brief press on the input element 11. The apparatus according to the invention does not just receive an ordinary signal for the activated key, but also an information on which position the key has been activated.

This allows the invention for example to distinguish between alternative key assignments within an single keypress.

Figure 3:
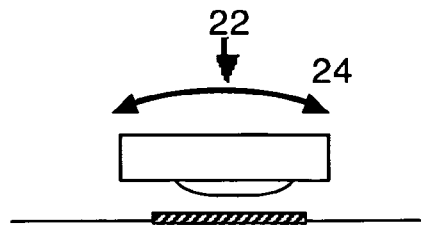

FIG. 3 illustrates the case when a key is pressed in its key center 22 and held in that position. Even in the held-down state it is still possible to manipulate the input element 11 with the finger, so that the tilt of this key changes into the direction 24. From this user interface action, the apparatus according to the invention does not just receive a signal for a continously held key, but also an up-to-date information about the specific tilt of the input element 11. This allows to activate and control a cursor movement with the invention.

Figure 4:
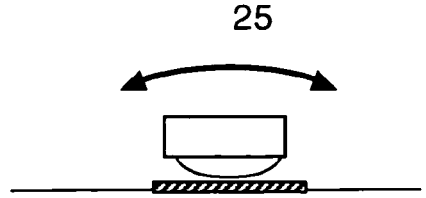

FIG. 4 shows an application where a permanently resting input element 11 can be moved like a joystick etc. The element bounces back into the center position when released.

FIGS. 5, 7, 9 and 12 show cross-sections of four different states of an input element 11 according to the invention. FIGS. 6, 8, 10, 11, and 13 show the corresponding contact matrix as a pattern resulting from each activation. In these figures, open contacts are indicated with a white rectangle and closed contacts are indicated with a black rectangle.

Figure 5:
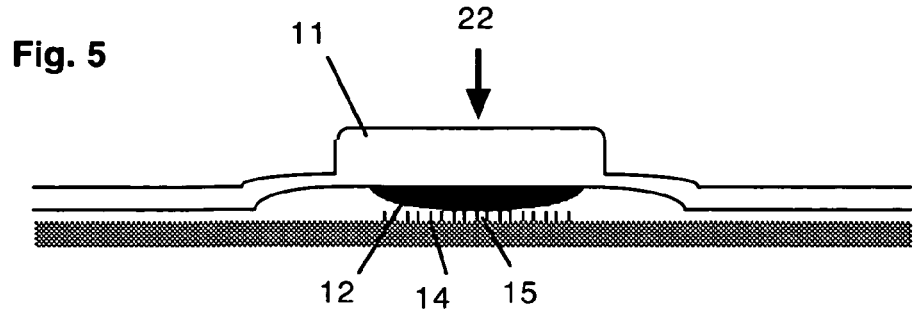
Figure 6:
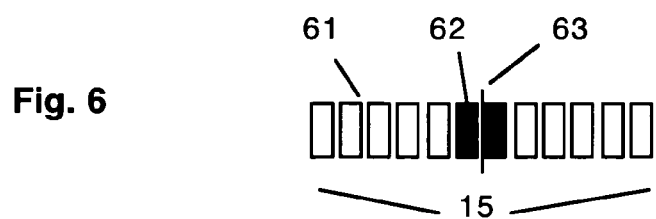

FIG. 5 shows an input element 11 that has been normally activated in the center. The contact medium on the underside of the input element touches the conducting paths of the contact matrix 15 in the center accordingly, as indicated on FIG. 6 with two black rectangles.

On FIG. 7, the same input element 11 has been pressed slightly harder. Now the soft underside of the input element is deformed, i.e. the calotte 12 (e.g. a pill made from electrically conductive rubber), resulting in contact between many points of the contact matrix 15, and a signal is generated with four little boxes. The difference between FIG. 5 and FIG. 7 means that the construction according to the invention is capable of measuring the force applied to the input element 11; although this is only done indirectly through the deformation of the contact medium of the calotte 12.

FIG. 9 displays the input element 11 activated at the left edge 21. This could result in contacts of the contact matrix 15 as shown in FIG. 10 and a corresponding signal. However, considering the huge number of contacts in the contact matrix 15 it is possible that single contacts fail in exceptional cases as illustrated on FIG. 11. The procedure to sense and process input pulses evoked by mechanical activation of input elements according to the invention leads to useful results even in such a case. This is because the electronic controller of the pattern recognition unit 17 determines the center of the closed contacts in terms of the mathematical average of the position. This means that even in this case a reflection of the tilt of the input element 11 comes as a result.

FIG. 12 shows the input element 11 activated on the extreme right edge 23, accordingly the contacts 63 are closed and the signals appear at the right side of the contact matrix as indicated on FIG. 13.

The procedure according to the invention allows to either determine the tilt of an input element along a single axis as shown on FIG. 5 to FIG. 13, or alternatively the tilt of the input element 11 in arbitrary directions can be registered. This depends only on the convex underside of the input element 11 (longish or circular) and the contact matrix 15 (strip-like or more like a square).

In order to measure on a single axis, a contact matrix as shown on FIG. 14 or FIG. 15 is sufficient. The underside of the input element 11 must lie down on these contacts when mechanical force in the range between 20 and 500 grams is applied. Depending on the tilt of the input element 11, different contacts of the contact matrix 15 are closed. On FIGS. 14 and 15 the potential resting area of the calotte 12 that is moved with the input element 11 appears as a screened rectangle 141.

On FIG. 14, six conducting paths with contacts lead to the top and another six lead to the bottom, the calotte 12 is capable of connecting them. Such a contact matrix could therefore differentiate approximately six activation angles; to be precise, even more as intermediate values can be recognized through the combination of multiple contacts. The contact matrix 15 shown in FIG. 15 even allows to distinguish between eight activation angles with a lower count of conducting paths, as several conducting paths have been combined.

In its simplest case, a contact matrix 15 for a procedure according to the invention could get along with three conductive paths: left side, right side and the electrical antithesis. This would result in only three activation angles (only left side or both or only right side). This would be a very inaccurate measurement, that could still be useful depending on the application.

FIG. 16. shows an input element 11 shaped like a disc, that can, originating from a home position in the center 161, be moved into any direction by pressing the edge 162. FIG. 16 shows an example of an upper side of such an input element 11, while FIG. 17 shows the underside with a large circular calotte 12 in its center.

This shape of a calotte 12 could encounter grid-like conductive paths equipped with contacts, for example, as shown on FIG. 18. With a large number of contact points, the conductive paths must be placed in two electrically separate layers. The right side of FIG. 18 shows an enlarged detail of the conductive paths, the vertical conductive path placed underneath and electrically separate from the horizontal conductive path. FIG. 19 and FIG. 20 show further examples of such conductive path layouts, where FIG. 20 requires only a single layer of conductive paths.

The electronic scanning unit 16 shown on FIG. 1 determines which connections are closed and derives from it a bit pattern that includes all possible contacts. Scanning the conductive paths is similar to the scanning of an ordinary PC keyboard. The different contact combinations are subsequently supplied with signals and on the other side the level signals whether there is an electrical connection in the specific row or column.

FIG. 21 and FIG. 22 show examples of such bit patterns derived by scanning. FIG. 21 shows the result of a medium force in the upper left area. The single light contact point within all the black spots indicates a possible defect of a single contact point: Considering the large number of contact points and the possible rapid movement of the control element, a perfect contact is impossible and not even necessary. The pattern recognition unit 17 shown in FIG. 1 calculates the average of the registered conductive paths automatically. With FIG. 22, the lower count of contacts clearly indicates that the applied force on the control element is lower than in the situation of FIG. 21.

The procedure to sense and process input pulses according to the invention can be adapted to different shapes of input elements, as shown on FIG. 23 to FIG. 27. The input element 11 is mounted flexible in a way that it can be pressed downwards and to the sides, but returns to its original position whenever it is released.

The input element 11 can be designed in a shape that resembles well-known keys from pocket calculators, mobile phones etc. (FIG. 23 and FIG. 24). The calotte 12 serving as a contact medium (shown black in these figures) however has a special curvature, that closes different single or multiple contacts of the conductive paths depending on the tilt. In its simplest form, only two contacts can be closed that are established with three conductive paths. This allows to distinguish three separate activation angles apart from the passive state. The calotte 12 is accordingly flat in its center and bevelled to the edge, to allow three positions with a specific activation angle for each.

This most basic implementation of the invention differs from known seesaw keys in that way, that with the input elements according to the invention either one, the other or both contacts may be closed (two signals, three conditions), whereas with ordinary seesaw keys only a single contact may be closed at a time (two signals, two conditions).

Besides, the input elements according to the invention exhibit none or only a single tactile threshold. Even when due to low count of conductive paths no individual tactile thresholds can be felt with the elastic force 13 of FIG. 1, it is still possible that certain edges 234; 235 of the calotte 12 can be felt during a movement of the input element 11 in held-down state according to FIG. 3.

With known seesaw keys however, every position requires a separate tactile threshold, because otherwise no unambiguous activation would be possible. This means that the mechanical construction of known seesaw keys is complex, as the transition between the combined keys means an unstable connection. With the invention, however, the transitions and multiple contacts pose no problem; in the contrary they are utilized to determine the tilt of the input element 11.

With an input element 11 with a larger number of contacts (FIG. 24) the calotte 24 is rounded like a cutout from a globe. The diameter of this fictional globe should approximate the size of a human hand, as the input elements 11 are tilted with the hand.

A group of input elements 11 in the shape of keys according to FIG. 23 and FIG. 24 can be produced like keyboards of common electronic devices from a silicon rubber mat, that integrates the upper side of the input element 11, the elastic force at its edges and the fixing in a single flexible component.

This allows a cost-effective production and allows the combination with ordinary keys. According to FIG. 23 and FIG. 24, the contact medium can be implemented as a carbon pill resp. made from electrically conductive rubber; these materials are widely known and used for keyboards.

Alternatively, a polyester dome foil can be mounted between the input element and the conductive paths, which fulfills the functions of the elastic force and with a conductive coating on its underside such as carbon, metal etc. fulfills the function of the contact medium (FIG. 25). Such input elements shaped like key domes can alternatively be built completely from metal and are usable for a construction according to the invention, as long as the metal dome is soft enough to ensure contacts according to the tilt.

A joystick on the basis of the same materials as FIG. 23 and FIG. 24 is shown FIG. 26. Such a design is cheap to produce and easy to combine with keyboards.

At last it is possible to mount an input element detachable on a touch screen as shown on FIG. 27. Touchscreens typically register a mechanical activation on a single spot of a display. The input element according to the invention creates exactly such a pressure concentrated on a single spot, where the touch position depends on the tilt. The grey shown base plate 14 covers the touch screen and protects it from mechanical pressure; at well-defined notches underneath the input elements any input element can however reach the touchscreen and activate it at different coordinates depending on the tilt.

As a permanent construction it would be unreasonable to create such a combination, as a touch screen costs much more than a contact medium in the form of a calotte together with conductive paths. However, as an alternate input device this solution might be useful, e.g. as a keyboard that could be mounted on a palm computer with tilting keys offering multiple key assignments, or as an optional mountable joystick for game control.

Palm computer and smart phones feature a casing 281 (FIG. 28) containing a large touch-sensitive display 271 as an input device (FIG. 28). Such a touchscreen is suitable for operating a graphical user interface with a pen or with a finger directly on the display 271. At the same time, a touchscreen is less suitable for games (a joystick would be preferable for these) and also less suitable for data entry (keys would be preferable for input).

The invention allows to equip such a touchscreen device with additional input elements 11 within a very small space. To this end, the base plate 14 of a unit according to the invention (FIG. 29) with input elements 11 (FIG. 29) is mounted from the top or the side of the casing 281 (FIG. 29), in a turn-over or clip manner, so that a part (max. 50%) of the touchscreen, i.e. the display 271 (FIG. 29) is covered.

The rest of the display is still available for software displays.

The touchscreen surface 271 can be touched mechanically underneath the base plate 14 by single input elements 11, if these are activated (FIG. 30). The base plate 14 could for example be clipped to the sides of the casing 281 (FIG. 30).

The electrical contacts that are closed through the activation of the input elements 11 through the contact medium, the calotte 12, are subsequently scanned by a electronic component, the scanning unit 16. This scanning is a well-known procedure, that is in use with almost every keyboard of an electronic device, so there is no need to describe it in detail here. Existing devices make use e.g. of a contact matrix of 8×8 conductive paths to scan a keyboard with up to 64 keys; the invention uses a similar contact matrix for of a single input element 11. The contacts are scanned just like keyboards with changing pulses in a rate between 5 and 50 scans per second.

The result of the scanning creates a bit pattern that is transmitted from the scanning unit 16 to a micro controller with software, the pattern recognition unit 17 for evaluation (FIG. 1). After every scan cycle, a yes/no information is transmitted for every conductive path which indicates whether the specific contact is closed (i.e. touched by the contact medium) or open. This bit pattern allows the software to calculate the position (resp. the tilt) as well as the applied pressure of the activation, if required.

The number of conductive paths can be varied depending on the application. More paths allow a higher precision of the tilt measurement, but require higher cost. In practice, between three and twenty conductive paths will be reasonable for a one-axis measurement (as seen on FIG. 14 and FIG. 15) and with a measurement into all directions, between six and a few hundred contact points.

The steps are listed in detail on FIG. 31. After the start, all input elements are checked for activation at step 312. It is possible to evaluate a single element only or alternatively it is possible to combine multiple input elements and evaluate them with one electronic circuit. Step 312 ensures, that the following calculation are based on the activated element and it is repeated (313), until an activation is detected.

After this, the conductive paths of the activated element are analysed 314. The bit pattern of the contacts allows to conclude the activation angle, i.e. the tilt of the element 315 by calculating the average of the positions. For instance, if there are ten conductive paths in one axis with an input element 11 and the paths 2, 3 and 5 are connected, then step 315 will make the following calculation: (2+3+5)/3=rounded 3.33. Normally, all conductive paths are placed in a regular interval, and the calotte 12 will react to a changed angle with a proportional change of the contact position. In such a case, the average of the contact positions directly resembles the tilt. For special applications, the conductive paths could also be placed in irregular intervals or the contact medium calotte 12 can be especially flat or steep. In these cases, the controller must determine the tilt with a table or specific formula that reflects the mechanical characteristics.

Step 316 (FIG. 31) determines the applied force, if this is relevant for the application. In order to achieve this, the number of closed contacts is simply counted. A stronger pressure leads to a stronger deformation of the contact medium (calotte 12) and thus to a larger number of contacts.

This kind of force measurement is inaccurate and will in most cases only allow to distinguish between three and eight levels of pressure. The exact conditions depend on the hardness and the form of the contact medium (calotte). If a higher precision of force measurement is required, this can be achieved with a higher number of conductive paths, a softer contact medium (calotte) and a more accurate formula to reflect the mechanical characteristics of the contact material (calotte).

At step 317, the result of the calculation are delivered to the operating system (OS), where they may be used to control a cursor, for a game control or for data input. If the input element is activated continously, the steps 313 to 317 are repeatedly passed, i.e. a possibly changed activation position or force is permanently evaluated.

The sensor according to the invention constitutes a significantly more compact sensor than potentiometers or discs with holes can offer in order to determine the tilt of input elements. Therefore, it can easily be integrated into mobile electronic devices just like known force sensors and seesaw keys. The different properties of known technologies in comparison with the invention are shown in the table of FIG. 32.

Force sensors make use of FSR (Force sensing resistors), strain gauges or hall sensors as a basis for measurement. By contrast, the known keys simply close an electric contact. The invention integrates a plurality of electrical switches into a single mechanical input element.

Force sensors are used for example to operate of the mouse pointer of notebook computers, by mounting a small joystick between the keys (TrackPoint). A sensor underneath the TrackPoint measures the lateral force that a person applies to it. A mechanical tactile threshold, similar to a key function, that would precede an activation is not provided. However, there are versions of TrackPoint controls that allow an activation depending on a higher pressure like a mouse key function. Normal keys only react to an activation from the top, i.e. force applied downwards. With the invention however, it is possible to register the tilt of an input element with a scalable resolution and at the same time the function of several keys in a single input element is integrated. But this key function can be dropped depending on the application, so that the invention can be used solely for cursor control. A tactile threshold as with normal keys is possible with the invention, but could be dropped as well.

Typical force sensors allow to control a with a variable speed. This is also possible with the invention, while ordinary keys do not offer such a function. Force sensors have this capability because they can measure several levels of pressure, the resolution resulting from the sensor hardware. The established force sensors, especially strain gauges, offer a high resolution of over one hundred steps. This makes them adequate for controlling the mouse pointer of a notebook computer. With smaller electronic devices, this precision is actually a disadvantage because it is not required and increases cost.

Keys do not allow a variable activation and therefore they are not capable of analog control. The invention, however, is scalable in the way that depending on the requirements a higher or lower number of conductive paths can be applied. At the same time, the input element itself can be kept unchanged.

With force sensors, there is a definite relationship between the analog input signal and the result of the required controller circuitry for analog-digital conversion. With switches, there are only two alternatives, open or closed. The invention, however, does evaluate digital signals of the conductive paths, but it requires a pattern recognition procedure in order to calculate a position and if necessary the force from a number of parallel activated switches.

If the tilt of the input element is evaluated on two axis, then the analog signals of multiple force sensors can be interpolated to determine the tilt direction. For example, if a sensor in a north direction is activated as strong as a sensor in west direction, then it can be concluded that the control element is tilted towards north-west. This is a well-known technology. The precision of analog force sensors allows to differentiate more than one hundred segments of a circle.

Ordinary switches can differentiate as many directions as there are switches, i.e. normally two or four. However, the invention allows to differentiate between many more circle segments, depending on the number of conductive paths, but less than with force sensors. For compact electronic devices, this is fully acceptable.

Force sensors and the corresponding analog evaluation electronic circuits are more or less temperature-sensitive; aging of components, production tolerances or lack of calibration can also lead to inaccuracies. Switches and the invention are not affected by this problem at all.

The solution according to the invention is much more reasonably priced, it is more robust and more compact than traditional potentiometers and code switches. The invention goes far beyond traditional key functions and is thus practical for the operation of powerful software user interfaces with many functions. The resolution of the measurement is lower than with high-grade force sensors. On the other side, the fully digital evaluation and the almost perfect stability still guarantee a precision that is comparable to force sensors.

The digital interface and the form factor that can be manufactured automatically as a component of keyboards allows to produce the invention a level of scale cheaper than force sensors. The effort and the resulting expenses are only slightly higher than traditional keyboards.

The scalable precision and the various constructions allow to adapt the invention to almost any requirements; notably it offers both functions for cursor control as well as functions for data entry in keyboard style.

The measurement of the tilt of input elements for mobile electronic devices requires sensors to control cursors and to operate the powerful software of current electronic devices, where the demands for the cursor positioning are lower for a mobile device with a smaller screen than with a huge display.

Such sensors must be small, light, robust and easily and automatically producable. It is an advantage if the sensors consists of very few components and can be integrated into keyboards. The solution described by this invention fulfils these requirements.

LIST OF TERMS 10 user interface
11 input element
12 calotte
13 elastic force
14 base plate
15 contact matrix
16 scanning unit
17 pattern recognition unit
18 contact coating
19 underside
21 left edge
22 center
23 right edge
24 Key with user interface action press and hold
25 joystick movement
62, 63 closed contact
111 open contact
141 screened rectangle
142-145 contact
161 center
162 edge
181, 182 conductive path
211, 212, 231 average
232 contact
234, 235 edge
236 casing
251 flexible foil
252 convex curvature
253 electrically conductive coating
254 case
261 case
271 display
273 notch
281 case
311-315 step of algorithm

The invention claimed is:

1. A device for detecting a mechanical actuation of an input element, that is spring-suspended in one plane and is from a level actuatable both in a vertical direction as well as in a direction that is diagonal to the vertical at a specified angle to the vertical axis, the device comprising a switch element converting motions subjected onto the input element into electrical, digital signals, and a control module working on a basis of pattern recognition that translates the electrical, digital signals supplied from the switch element, wherein the switch element exhibits a multitude of contact pairs of a contact matrix that can be closed arbitrarily depending on a position of the input element.

2. The device according to claim 1, wherein the switch element consists of a base plate placed underneath the input element that exhibits the contact matrix equipped with the contact pairs and wherein the input element exhibits a calotte on its underside that exhibits an electrically conductive contact coating on its convex surfaces opposite to the underside.

3. The device according to claim 2, wherein the calotte consists of a deformable material, mainly an elastomer.

4. The device according to claim 2, wherein the calotte exhibits a flat area in its center with a surface stretching parallel to the underside of the input element and a bevel at its edges.

5. The device according to claim 2, wherein the calotte exhibits a profile of a polygone shape with no more than ten edges that corresponds to the underside of the input element.

6. The device according to claim 2, wherein the calotte exhibits a circular shape.

7. The device according to claim 2, wherein a flexible foil is provided underneath the input element between the calotte and the contact matrix with a convex curvature that is flexibly manouevrable into the direction of the input element and is equipped with an electrical conductive coating at the underside in the area of the contact matrix.

8. The device according to claim 2, wherein the input element is shaped as a joystick and flexibly mounted underneath a case cover, and further wherein the calotte has a convex shape.

9. The device according to claim 2, wherein the input element is mounted flexibly opposite to a base plate within the casing and is fixed to the base plate, and further wherein the base plate exhibits a notch through which the calotte can actuate a touch screen.

10. The device according to claim 2, wherein a base plate lies on a display with an integrated touch screen and attached to it in a way that is undoable without any tools, so that the calotte activates the touch screen through a notch in the base plate whenever the input element is activated, so that the touch screen registers a specific position on the touch screen area depending on the actuation angle of the input element because of mechanical actuation by the calotte, and this position is transmitted for further processing, leading to a different content on the display depending on the position.

11. A method for detecting a mechanical actuation of an input element, the method comprising:
    providing the device according to claim 10;
    interpreting a bit pattern received by a pattern recognition unit from a scanning unit, wherein bits represent closed contacts of the contact matrix, in a way where a number of closed contacts is summed up to derive a flattening of the calotte during activation of the input element; and
    deriving an applied pressure of the input element from the flattening of the calotte during the activation of the input element.

12. A method for detecting a mechanical actuation of an input element, the method comprising:
    providing the device according to claim 10;
    interpreting a bit pattern received by a pattern recognition unit from a scanning unit, wherein bits represent closed contacts of the contact matrix, in a way that two arithmetical averages are derived from spatial positions of the closed contacts; and
    deriving a tilt of the input element along two axes from the two arithmetical averages.

13. The device according to claim 1, wherein the contact matrix exhibits the multitude of contact pairs along one axis.

14. The device according to claim 1, wherein the contact matrix exhibits a two-dimensional contact allocation.

15. The device according to claim 1, wherein the contacts pairs of the contact matrix are arranged in pairs of an alternating sequence.

16. The device according to claim 1, wherein the contact pairs of the contact matrix are arranged coaxial to each other in an alternating sequence.

17. The device according to claim 1, wherein the contact pairs of the contact matrix are arranged in a cross-over sequence.

18. The device according to claim 1, wherein the input element and a casing exhibiting flexible characteristics constitute a constructive unit.

19. The device according to claim 1, wherein the base plate is equipped with a software controlled electro magnet for delivering a tactile feedback to an actuation status of the input element.

20. The device according to claim 1, wherein an integrated circuit is provided underneath the input element on a base plate that exhibits a multitude of electrodes performing the function of contacts, the integrated circuit being equipped with two power supply contacts, an input data transmission line for configuration and three output data transmission lines for output data of x, y and z values of corresponding spatial axes.

21. A method for detecting a mechanical actuation of an input element, the method comprising:
    providing the device according to claim 1;
    checking rows and columns of the contact matrix for an electrical connection in a rapid sequence approximately 50 times per second via a scanning unit, wherein an arbitrary combination of contacts of the contact matrix are connected; and
    generating a bit pattern from these checks via the scanning unit wherein the bit pattern is transmitted to a pattern recognition unit for processing.

22. The method according to claim 21, wherein the pattern recognition unit interprets the bit pattern received from the scanning unit, wherein bits represent closed contacts of the contact matrix, in a way that an arithmetical average is derived from a spatial position of the closed contacts and a tilt of the input element along an axis is derived from the arithmetical average.

23. The method according to claim 21, further comprising:
    closing one or more of the multitude of contact pairs on the contact matrix with a calotte of the input element, wherein the multitude of contact pairs are arranged two-dimensionally with respect to the contact matrix; and
    deriving a tilt from the position of the one or more closed contacts via a controller.

24. The method according to claim 21, wherein a calotte of the input element closes up to two contacts on the contact matrix, so that a lateral actuation closes a single contact and an actuation in a center closes two contacts.

25. The method according to claim 21, further comprising:
    tilting the input element against an elastic force by an operating person for measuring an activation of input elements of electronic devices, so that an electrically conductive, curved area on an underside of the input element touches the contact matrix at various positions and thus closes one or more electrical contacts, wherein the input element is formed as a key or a joystick;
    evaluating the one or more closed electrical contacts via a control module consisting of a scanning unit and a pattern recognition module; and
    deriving a tilt and a direction of the activation of the input element from one or more positions of the closed contacts.

26. The method according to claim 21, further comprising;
    deriving an applied pressure from a number of closed contacts, wherein the number of closed contacts is determined by a flattening of a contact medium calotte, of the input element, on the contact matrix as a result of force applied to the input element.

* * * * *